United States Patent
Geier et al.

[15] 3,706,496
[45] Dec. 19, 1972

[54] CINETHEODOLITE

[72] Inventors: George Geier, Teaneck, N.J.; William E. Mimmack, El Paso, Tex.

[73] Assignee: The United States of America as represented by the Secretary of the Army

[22] Filed: Jan. 13, 1971

[21] Appl. No.: 106,211

Related U.S. Application Data

[63] Continuation-in-part of Ser. No. 669,319, Sept. 20, 1967, abandoned.

[52] U.S. Cl. ............356/149, 356/147, 356/143, 356/250, 33/1 T
[51] Int. Cl. ............................................G01c 1/10
[58] Field of Search............356/138–144, 147–149, 356/152, 247–251; 33/1 T

[56] References Cited

UNITED STATES PATENTS 2,505,819   5/1950   Wrigley..............................356/149

OTHER PUBLICATIONS

Mimmack, Optics Division Technical Memorandum, 64–1, WSMR Cienthodolite, 3–1964.

Primary Examiner—Benjamin A. Borchelt
Assistant Examiner—S. C. Buczinski
Attorney—Harry M. Saragovitz, Edward J. Kelly and Herbert Berl

[57] ABSTRACT

Light from a target passes through a lens system and forms an image on a focal plane, e.g. a picture on a camera film. At the moment the picture is taken we want to know the precise direction in which the camera is pointing so we establish the pointing axis of our cinetheodolite and camera with respect to the true vertical.

To determine the true pointing axis with respect to the vertical and record it on our film we introduce a light beam from a point source, reflect it off from a perfectly level reflecting surface, and past a reticle or cross hairs to create an image of the reticle, split the beam and reticle image into four component beams and images, and direct those four beams and images into the camera by means of optical deviators which are immune to the mechanical errors of the instrument. Each component beam and reticle image pinpoints a mark on the picture as related to the pointing axis with respect to the true vertical. In other words, the true pointing axis is determined by the imaginary "center" between the four beams and images.

5 Claims, 2 Drawing Figures

PATENTED DEC 19 1972 3,706,496
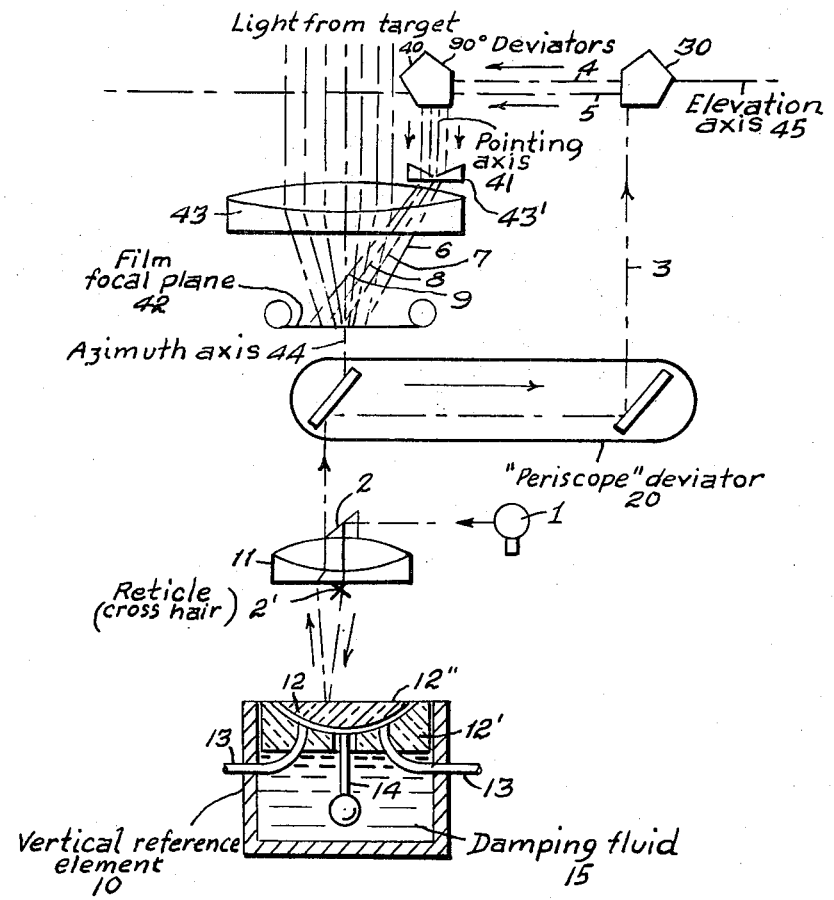
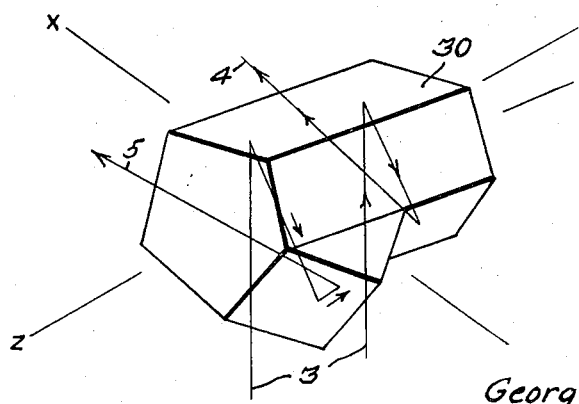
INVENTORS,
George Geier and
William E. Mimmack
BY: Harry M. Saragovitz
Edward J. Kelly & Herbert Berl
ATTORNEYS.

CINETHEODOLITE

This is a continuation-in-part of application Ser. No. 669,319 filed Sept. 20, 1967 now abandoned.

BRIEF SUMMARY

The present invention relates to theodolites and refers more particularly to a cinetheodolite having improved accuracy.

Theodolite principles are widely used for tracking guided missiles. Instruments utilizing these principles are used mainly for determining elements of trajectory. These elements are position and velocity coordinates.

The function of the theodolite is realized by the measurement of angular coordinates of an azimuth circle about a vertical axis and an elevation circle about a secondary axis. A cinetheodolite accomplishes this by a two-stage process. The angular coordinates of a pointing axis are determined from graduated circle markings photographed together with the target. This information is then used to determine target position with respect to the pointing axis. The cinetheodolite has good accuracy and passive detection capability.

Practical theodolites fall short of the performance specified because of numerous static and dynamic errors. Some of these involve collimation, azimuth angle measurements, azimuth reference, trunnion twists, mislevel, scale factor, and image measurement errors.

Improvements in the accuracy of theodolites have been oriented toward stiffening of the structural elements through new materials or new uses for old materials. However, materials technology advances rather slowly and a great effort has been expended in designing bearings suitable for the azimuth axis of tracking mounts. Great effort has also been expended in devising mounting structures for optical elements and telescope tubes.

The present design deviates from these approaches in the geometry and construction of appropriate optical flats and light beams.

One object of the present invention is to provide an optical theodolite which overcomes many of the disadvantages of the prior devices.

Another object is to provide an optical theodolite which eliminates the effects of dynamic error sources.

Other objects will become apparent in the course of the following specification.

IN THE DRAWING

FIG. 1 is a schematic simplified optical arrangement of the present invention;

FIG. 2 is a view of one of the 90° deviators.

The present invention will appear more clearly from the following detailed description when taken in connection with the accompanying drawing showing, by way of example, a preferred embodiment of the inventive idea.

Referring to FIG. 1, the basic elements are light source 1, prism 2, reticle 2', vertical reference element 10 and deviators 20, 30, and 40. Light from source 1 is deflected downwardly by prism 2, past reticle or cross hairs 2' and to the vertical reference element 10. Surface 12'' of vertical reference element 10 always remains level (a mercury pool is the classical device of this type).

Light rays reflected from surface 12'' pass through collimator 11 and emerge normal to the reference surface regardless of any tilt of the collimator lens 11. Deviator 20 comprises two optically flat reflectors rigidly mounted with respect to each other so that the emergent ray is always parallel to the entering ray despite variations in the orientation of deviator 20. Thus, light from deviator 20 always remains normal to the local gravity reference surface, whatever tilt the instrument may experience. Deviators 30 and 40 are constant deviating elements. They split an entering light beam into two light beams and the bisector of the two beams is independent of the orientation of the deviator about the axes normal to the entering beam. Each of the light beams exiting from 90° deviator 30 enters one of a pair of smaller deviators 40 of the same construction. The four beams leaving the pair of deviators 40 are directed toward the objective lens 43 of the instrument along with the light from the target. Thus, in the focal or film plane 42, four images are formed of the reference reticle, illuminated by light source 1, along with the image of the missile target. The center position of the reference images is independent of structural errors of the theodolite.

Note: FIG. 1 is schematic and intended to illustrate generally the principles of operation. The path of a theoretical light ray is traced through the optical system. And, that ray is split into two, and then into four rays. In reality light source 1 is not a true "point" of light, and some scattering of rays may also occur. Further, as is explained in detail hereinafter, some of the rays are shown out of place so as to schematically illustrate their general paths, as will be obvious to those skilled in the art.

In actual construction prism 2 is tiny compared to collimator lens 11. Scattering rays from light source 1 strike at various angles and are reflected downwardly at various angles. These rays strike horizontal surface 12'' at various angles and are reflected back upwardly at various angles and into collimator lens 11. In lens 11 most of the rays pass through, outside of prism 2, and are straightened up, that is they pass out from collimator lens 11 in perfectly vertical paths. Each vertical ray strikes the deviator mirrors in "periscope" 20 and emerges as a perfectly vertical ray 3.

Deviators 30 and 40 also act as beam splitters (note FIG. 2). Deviator/splitter 30 splits each incoming bundle of rays 3, into two bundles of rays illustrated schematically at 4 and 5. In FIG. 1 the bundle of rays 4 are directly behind the bundle of rays 5, and they diverge slightly as illustrated schematically in FIG. 2. Therefore, the bundle of rays 4 strikes one deviator/splitter 40 slightly behind the plane of the drawing in FIG. 1 while the bundle of rays 5 strike the other deviator/splitter 40 slightly outwardly (toward the person viewing FIG. 1).

Now, beams 4 and 5, traveling perfectly horizontally to the left in FIG. 1 strike the pair of deviator/splitters 40. Here they are deviated precisely 90° downwardly (as shown in FIG. 1) and emerge in a perfectly normal direction to the elevation axis parallel with the pointing axis of the optical system. In addition to being deviated 90° the two beams and images of reticle 2' are split into four beams and images. These four are schematically illustrated as 6, 7, 8 and 9. These four beams pass through wedge prisms 43' and through lens 43 which act together in a well-known manner to deviate the beams and form four images of the reticle 2' on the film plane 42. Beams 6, 7, 8 and 9 are illustrated schematically as spread out from right to left in FIG. 1. In reality the images formed by these beams move in an annular area on the film plane around the target image.

The four images fix on the film four precise reference markings, the center of which relates the pointing of the camera to the true vertical.

In order to better understand the gyrations the system may be put through in use the upper mechanism is movable in azimuth and elevation in a manner similar to any theodolite. (Everything below periscope 20 is stationary.) Everything above the collimator 2 rotates in azimuth about the vertical axis 44. The elevation axis 45 passes horizontally through deviator 30 and between deviators 40. Deviator 30 is fixed with respect to the elevation axis. However, deviators 40 and lens system 43 tilt toward the person viewing FIG. 1 or away from the viewer about axis 45. As shown schematically in FIG. 1 the film would tilt with the lens about the elevation axis 45. In any practical instrument, known optical means would be used to deviate the image forming light to a fixed film plane. Just as with any theodolite telescope the upper mechanism may rotate or tilt to a point in any direction above or below the horizon within the mechanical constraints. This permits tracking of a missile, plane or other object. The vertical reference element and deviators described above give a perfect correlation between the true vertical and the pointing axis.

The vertical reference element 10 may be made up of a gas bearing with spherical pads of glass 12 and 12'. Pad 12' serves as a support element for crown element 12. The lower surface of the upper pad and the upper surface of the lower pad are worked optically. The surfaces conform very accurately. The upper surface 12'' of the upper pad is an optical flat, a normal to which is coincident with the vertical axis of the instrument. The working fluid is air at low pressure introduced at 13. The upper pad is fixed with a stem 14 which extends down to a damping fluid 15. The system behaves like a simple, damped pendulum of length preferably equal to the radius of the spherical surfaces. The device may be checked for accuracy as a reference element by rotating the upper pad about a vertical axis and adjusting the balance of the upper pad until no deviation of the normal to the flat surface is noticed with this rotation. The device stands level within about 0.1 second of arc over a tilt range of several minutes of arc.

Directly above the vertical reference element is the vertical reference collimator 11. This collimator works in conjunction with the vertical reference element 10 and the collimator is so designed that the rear nodal point is at the surface of the rear element or behind the rear surface in the object space. Reticle 2' is situated at the nodal point. The vertical reference surface is placed so that the image of the reticle is formed at the focal point of the lens. Thus, light from the reticle forms a collimated beam after passage through the lens. Two properties of this system are important. First, the direction of a line from the focal point of the lens to the rear nodal point is always perpendicular to the surface of the vertical reference element 10. Second, since the direction of this line defines the direction of the collimated beam, the beam remains vertically oriented regardless of any tilt of the lens or collimator 11. Emerging from the vertical reference collimator 11 is a beam of collimated light that is accurately normal to the reference surface and remains so, however the instrument, or instrument pedestal, is tilted. The lens 11 maintains a vertically collimated beam within 0.2 second of arc over a tilt range of several minutes of arc.

Deviator 20 is a periscope, that is, a conventional optical device having constant deviating properties. The beam emerging from deviator 20 is vertical, however the deviator is tilted. The faces of the two deviator flats must be accurately parallel and must remain so. A stable ferrous casting may be used as the tube for supporting the mirrors. A quartz spacer could be substituted with consequent decrease in thermal and other stability problems.

The instrument could be designed without deviator 20. In such a case, the vertical reference collimator lens 11 could be placed just below the 90° deviator 30 and used in conjunction with an annular ring of mercury.

Above the aperture of the deviator 20 is the first 90° deviator 30. The construction of this device is well known and is illustrated in FIG. 2. It consists essentially of two pentaprisms side by side, one of which has a plane-reflecting surface replaced by a roof edge. The pentaprisms have the well-known property of having a constant deviation with respect to rotation about the Z axis. With respect to rotations about the X axis, light rays through either section of the deviator 30 diverge slightly, that is they are angularly displaced but in opposite directions by the same amount. The average direction of the two beams emerging from the deviator 30 has a constant deviating property also with respect to rotation about the X axis. The average of these two beams defines the direction of the horizontal axis of the theodolite. This direction and this axis are insensitive to all tilts of the instrument.

The two beams emerging from the first 90° deviator 30 are intercepted by a pair of 90° deviators 40 which direct the beams toward the primary objective lens 43. Deviators 40 rotate about the elevation axis while deviator 30 does not. The original two beams of light and images from the first 90° deviator 30 are split into four by the pair of 90° deviators 40. The pointing axis 41 of the cinetheodolite is parallel to or coincident with the average direction of these four beams. This direction is insensitive to any mechanical errors or deflections of the instrument whatever.

The four beams of light and images from the second 90° deviator 40 fall upon the objective lens 43 which forms four images of the reticle on the film 42. The incoming light from the missile target follows the same path, through the lens system, to the focal plane. Consequently, any deflections of the lens system affect the position of the four reference images and the target image in the same way, and no error is introduced by the deflections.

It is apparent that the described example is capable of many variations and modifications. All such variations and modifications are to be included within the scope of the present invention.

What is claimed is:

1. Cinetheodolite apparatus comprising a fixed vertical reference element which provides a reflective horizontal surface despite any tilt of its support, a reticle, a source directing light past said reticle onto said surface for reflection therefrom, a collimator through which the reflected rays pass to form a true vertical bundle of light, first optical means to divide said bundle into two diverging beams, second optical means to divide said two diverging into four diverging beams and images, said second means directing said four beams and images through the cinetheodolite's primary lens system and to the film plane to form four images of the reticle as reference images in an annular area around a picture being taken to relate the true vertical to the pointing axis of the cinetheodolite.

2. Apparatus as in claim 1 and a prism to receive light coming in horizontally from said source and to deflect it downwardly past said reticle to said reflective surface of said reference element.

3. Apparatus as in claim 1 and a "periscope" deviator to receive the vertical bundle of light from said collimator, reflect the bundle off-center, and then reflect the bundle vertically into said first optical means.

4. Apparatus as in claim 1 wherein said first optical means comprises an optical deviator changing the direction of the outgoing beams by 90° from the incoming direction in the X/Y plane while diverging the beams away from each other in the Z plane.

5. Apparatus as in claim 1 wherein said second optical means comprises a pair of optical deviators changing the direction of the outgoing beams by 90° from the incoming direction and directing them toward the objective lens of said apparatus.

* * * * *